United States Patent
Fehr

(10) Patent No.: US 10,005,503 B2
(45) Date of Patent: Jun. 26, 2018

(54) THREE CONNECTION POINT FARM IMPLEMENT DOLLY FOR USE WITH AN ARTICULATING TRACTOR

(71) Applicant: Fehr's Industrial Manufacturing, LLC, Seminole, TX (US)

(72) Inventor: John Fehr, Seminole, TX (US)

(73) Assignee: Fehr's Industrial Manufacturing Co, LLC, Seminole, TX (US)

( * ) Notice: Subject to any disclaimer, the term of this patent is extended or adjusted under 35 U.S.C. 154(b) by 32 days.

(21) Appl. No.: 15/433,993

(22) Filed: Feb. 15, 2017

(65) Prior Publication Data

US 2017/0231147 A1 Aug. 17, 2017

Related U.S. Application Data

(60) Provisional application No. 62/295,401, filed on Feb. 15, 2016.

(51) Int. Cl.
*B60D 1/14* (2006.01)
*B62D 49/06* (2006.01)
*A01B 59/043* (2006.01)

(52) U.S. Cl.
CPC .......... *B62D 49/065* (2013.01); *A01B 59/043* (2013.01); *B60D 1/141* (2013.01)

(58) Field of Classification Search
CPC ...... B62D 49/065; B60D 1/141; A01B 59/043
USPC ................. 172/439; 280/476.1; 404/85, 86
See application file for complete search history.

(56) References Cited

U.S. PATENT DOCUMENTS

| | | | | |
|---|---|---|---|---|
| 2,302,246 | A * | 11/1942 | Nelson | B60D 1/46 280/476.1 |
| 2,481,005 | A * | 9/1949 | Danhaus | B62D 53/0864 280/124.114 |
| 5,666,747 | A * | 9/1997 | MacQueen | E01H 5/06 280/79.11 |
| 6,820,887 | B1 * | 11/2004 | Riggle | B62D 53/0864 280/405.1 |
| 8,317,452 | B2 * | 11/2012 | Lundin | B60G 9/003 280/434 |
| 9,370,977 | B2 * | 6/2016 | Sallis, Sr. | B60D 1/30 |
| 2017/0106778 | A1 * | 4/2017 | McConn | B60P 3/073 |
| 2017/0267299 | A1 * | 9/2017 | Nielsen | B62B 1/12 |

* cited by examiner

*Primary Examiner* — Gary S Hartmann

(57) ABSTRACT

A three point connection dolly for connecting an articulating tractor to a plow includes a dolly having a three point plow hitch configured to connect to a plow. The dolly also includes a chassis frame with a tractor hitch extension configured to extend the three point plow hitch a distance from the articulating tractor sufficient to allow rear wheels of the articulating tractor to fully turn.

20 Claims, 4 Drawing Sheets

Figure 1A:
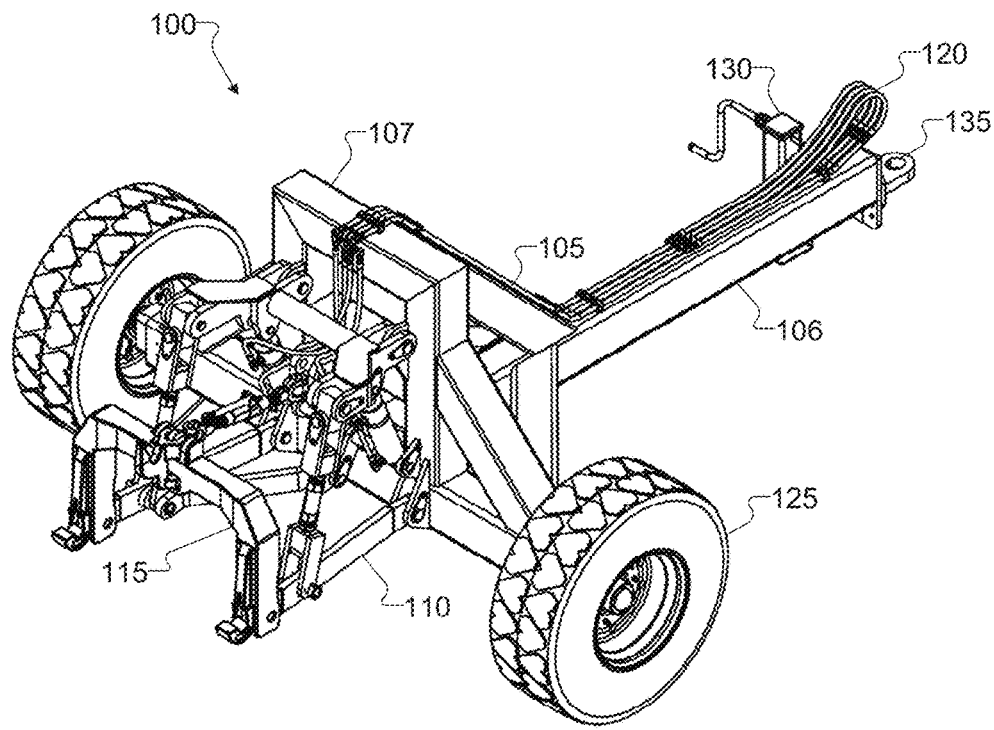
Figure 1B:
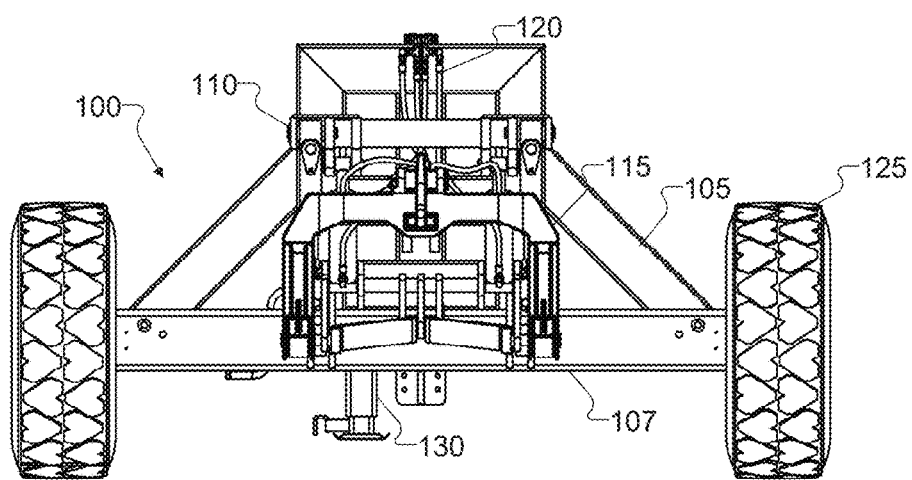
Figure 1C:
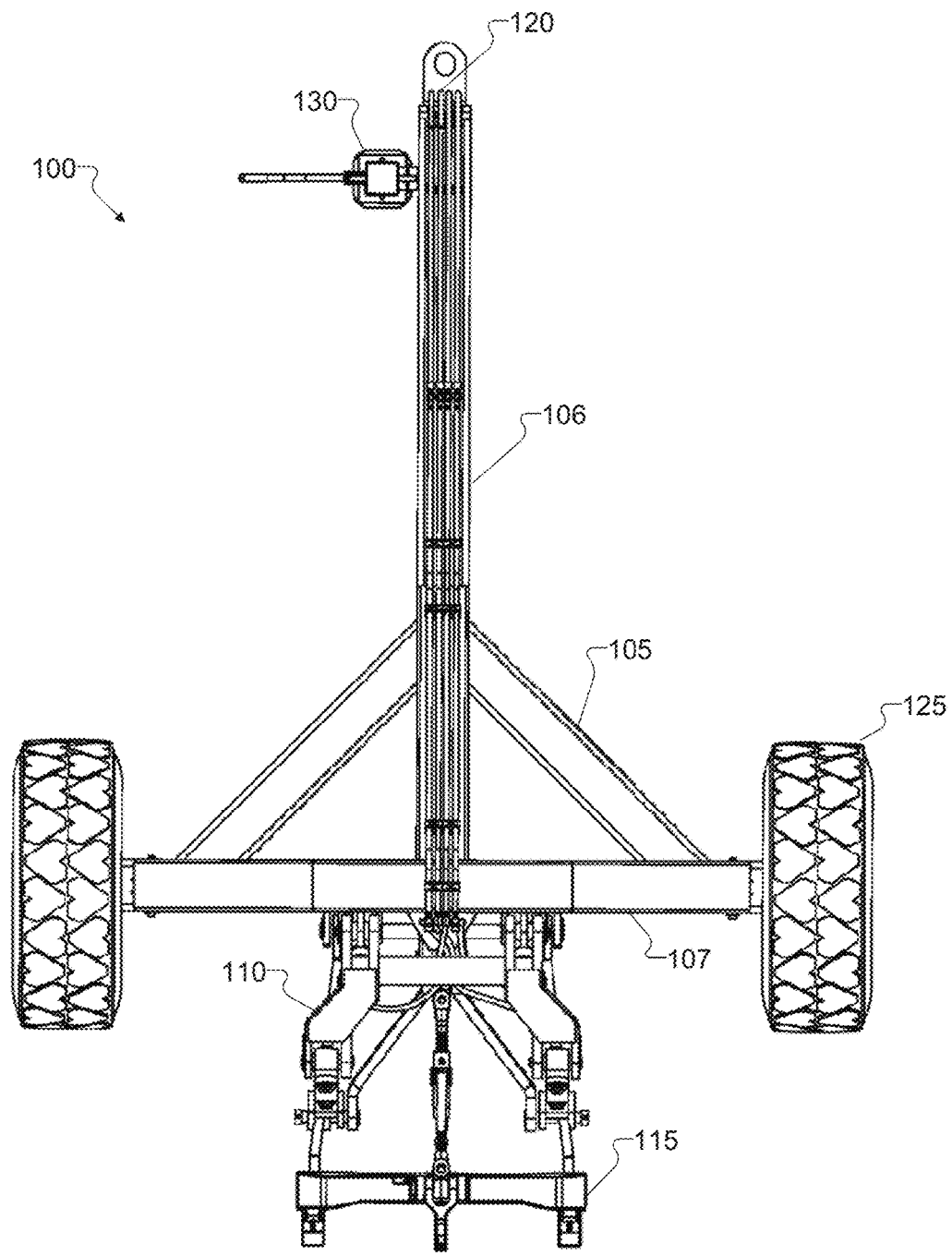
Figure 1D:
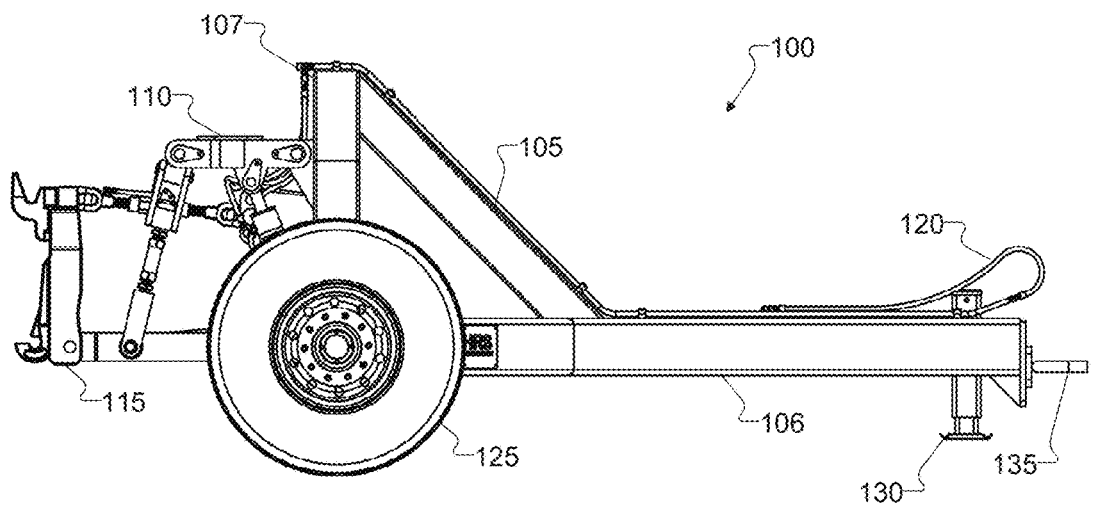

THREE CONNECTION POINT FARM IMPLEMENT DOLLY FOR USE WITH AN ARTICULATING TRACTOR

CROSS-REFERENCE TO RELATED APPLICATIONS

This application claims the benefit of the filing date of U.S. Provisional Patent Application No. 62/295,401 entitled "THREE CONNECTION POINT FARM IMPLEMENT DOLLY FOR USE WITH AN ARTICULATING TRACTOR" filed Feb. 15, 2016, the content of which is hereby incorporated by reference.

TECHNICAL FIELD

The present application relates generally to a dolly for an articulating tractor and more particularly to a dolly for articulating tractors with three connection points to a tractor attachment such as a plow or similar device.

BACKGROUND

As farming involves use of increasingly larger plows to reduce the plow time for a field, larger tractors are required to accommodate the force required for plowing. As the tractor size increases, on the other hand, the turning radius of the tractor also increases. Articulation between the front tires and rear tires has been incorporated to accommodate larger size with a lower turning radius.

Tractor attachments generally require multiple (e.g., three) connection points when attaching to a tractor, without which the tractor attachment may orient incorrectly with respect to the field or even tip over when dealing with, for example, a contour on a road.

SUMMARY OF THE DISCLOSURE

For a more complete understanding of the present disclosure and its advantages, reference is now made to the following description taken in conjunction with the accompanying drawings, in which like reference numerals represent like parts:

In a first embodiment, a three point connection dolly for connecting an articulating tractor to a plow is provided. The dolly includes a three point plow hitch configured to connect to a plow. The dolly also includes a chassis configured to extend the three point plow hitch a distance from a tractor.

In a second embodiment, a tractor assembly is provided. The tractor assembly includes a tractor configured to pull a plow and dolly connected to the tractor. The dolly includes a three point plow hitch configured to connect to a plow. The dolly also includes a chassis configured to extend the three point plow hitch a distance from the tractor.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 1A, 1B, 1C and 1D illustrate a dolly to connect a tractor to three connection points of a plow or similar device according to various embodiments of the present disclosure;

FIG. 2 illustrates a chassis of the dolly according to various embodiments of the present disclosure;

FIG. 3 illustrates an alignment assembly of the dolly according to various embodiments of the present disclosure; and FIG. 4 illustrates a three connection plow hitch of the dolly according to various embodiments of the present disclosure.

DETAILED DESCRIPTION

FIGS. 1A through 4, discussed below, and the various embodiments used to describe the principles of the present disclosure are by way of illustration only and should not be construed in any way to limit the scope of the invention. Those skilled in the art will understand that these principles may be implemented in any type of suitably arranged device or system.

FIGS. 1A, 1B, 1C and 1D illustrate a dolly 100 to connect a tractor to three connection points of a plow of similar tractor attachment according to various embodiments of the present disclosure. FIG. 1A is a perspective view, FIG. 1B is a rear view, FIG. 1C is a plan view and FIG. 1D is a side elevation view of the dolly. The dolly 100 includes a chassis 105, an alignment assembly 110, a three connection point hitch 115, a hydraulic assembly 120, a set of wheels 125, and a tractor hitch lift 130. The individual components will be described in greater detail below in FIGS. 2-4.

The dolly chassis 105 includes and is formed collectively by a three connection point frame 107 and a hitch extension 106. The three connection point frame 107 corresponds with the frame 205 and the hitch extension 106 corresponds to the hitch extension 200, both illustrated in FIG. 2.

Because the rear wheels of an articulating tractor turn, mounting the three connection point frame 107 immediately behind the tractor, at the normal location of a tractor attachment hitch point, presents challenges. The normal spacing of the three connection points for standard tractor attachments is wider than can be accommodated between the rear wheels when turned to as fully as possible. When an articulating tractor is turned for the sharpest turn (i.e., smallest turning radius), the rear wheels would contact the three connection point frame 107 if attached directly behind the tractor at the normal location of a tractor attachment hitch point. In addition, the rear wheel base on an articulating tractor is often insufficient to provide the support necessary to keep three connection point plows and similar tractor attachments in correct orientation, without twisting or even rolling over under the stresses caused by irregular contours.

For the above reasons, the hitch extension 106 provides a connection between the normal location of a tractor attachment hitch point on an articulating tractor and the three connection point frame 107 of the dolly chassis 105. The hitch extension 106 is preferably sufficiently narrow as to not interfere with full turning of the rear wheels on the articulating tractor. The hitch extension 106 couples the three connection point frame 107 to the tractor attachment hitch point on an articulating tractor with sufficient clearance to avoid interference by the three connection point frame 107 with full turning of the rear wheels. A distance of 2-3 feet between the hitch connector 135 at one end of the hitch extension 106 and the three connection point frame 107 will normally be sufficient to provide such clearance.

The three connection point frame 107 of the dolly chassis 105 serves to provide support for the three connection point hitch 115 and the tractor attachment connected thereto. A generally rectangular portion of the three connection point frame 107 provides attachment points for the alignment assembly 110 coupled between that generally rectangular portion and the three connection point hitch 115. Hydraulics connected between the generally rectangular portion of the three connection point frame 107 and the three connection point hitch 115 allow the and the three connection point hitch 115 and any connected tractor attachment to be raised or lowered about pivot points connecting the alignment assembly 110 to the generally rectangular portion of the three connection point frame 107.

In the example shown, a bottom crosspiece for the generally rectangular portion of the three connection point frame 107 extends beyond the vertical pieces of the rectangular portion, reinforces by angled trusses. That bottom crosspiece provides a mounting point for the set of wheels 125. The set of wheels provides a wide and preferably adjustable wheel base, which may be wider than the wheel base of the tractor's rear tires. A wheel base for the set of wheels 125 adjustable up to 12 feet may be useful for some embodiments of the dolly.

Although FIGS. 1A-1D illustrate one example of a dolly 100, various changes may be made to FIGS. 1A-1D. The makeup and arrangement of the dolly 100 in FIGS. 1A-1D is for illustration only. Components could be added, omitted, combined, or placed in any other suitable configuration according to particular needs. In general, the dolly 100 can be configured in any suitable manner according to particular needs.

Figure 2:
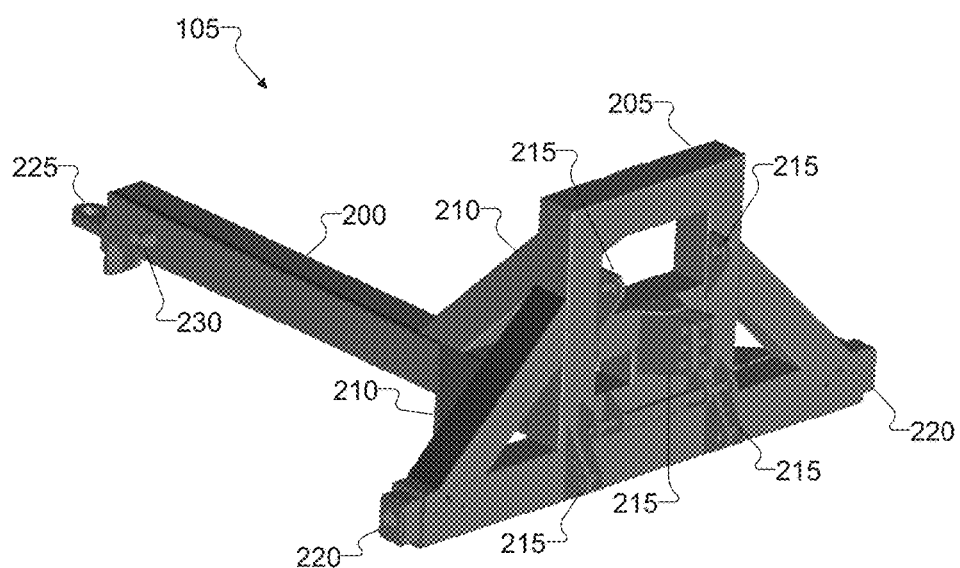

FIG. 2 illustrates a chassis 105 of the dolly according to various embodiments of the present disclosure. The chassis 105 transitions the forces generated while pulling the plow from a single point on the tractor to the three connections points of the plow. The chassis 105 includes a hitch extension 200, a frame 205, a plurality of transition beams 210, a plurality of alignment assembly connections 215, a plurality of axle housings 220, a hitch 225, and a tractor hitch lift connection 230.

The hitch extension 200 provides distance between the tractor and the plow. A longer hitch extension 200 increases the stability when the tractor is turning. The thickness of the hitch extension 200 is dependent on the size of the plow. A larger plow will require a stronger hitch extension considering that the hitch extension 200 experiences the full force transferred through the chassis 105. While illustrated as a single rectangular beam, the dolly 100 could include any number of hitch extensions 200 and the hitch extensions 200 included could be any shape, length, or thickness.

The hitch extension is connected to the frame 205. The frame 205 provides the support structure for the alignment assembly 110. The frame is illustrated with three beams forming a square at the center of a cross beam with two angle beams from the side of the square to the cross beam, but could be any structural shape or design. The frame 205 is supported by the transition beams 210, which transition the forces generated by the tractor pulling the plow from a single point to additional points on the frame 205 from the point the hitch extension 200 is connected to the frame 205.

The alignment assembly connections 215 are attached on the frame 205 corresponding to the connections or the alignment assembly 110. The locations and strength requirements of the connections 215 are a major factor for the design of the frame 205 and the transition beams 210. The connections 215 are mostly illustrated as bolt in socket connections, but can be any type of connection or combination of connections, including mechanical, magnetic, friction, or any other type of connection.

The chassis 105 also includes axle housings 220 for the connection of the wheels. The axle housings 220 are extendable from the cross beam of the frame 205. Extending the axle housings 220 increases the stability of the dolly 100 by creating a wider wheel 125 base. The axle housings 220 are illustrated using a bolt to lock the amount of extension. Removing the bolt allows the axle housings 220 to be adjusted to a suitable length for the plow. While the extension of the axle housing is secured using a bolt in FIG. 2, any method of locking can be used, for example, magnets, grooves, etc. The axle housing 220 can be extended manually or a mechanically using, for example, an actuator.

The chassis 105 also includes a tractor hitch 225 and a tractor hitch lift connection 230. Using the hitch lift 130, the hitch 225 can be connected to a tractor.

Although FIG. 2 illustrates one example of a chassis 105, various changes may be made to FIG. 2. The makeup and arrangement of the chassis 105 in FIG. 2 is for illustration only. Components could be added, omitted, combined, or placed in any other suitable configuration according to particular needs. In general, the chassis 105 can be configured in any suitable manner according to particular needs.

Figure 3:
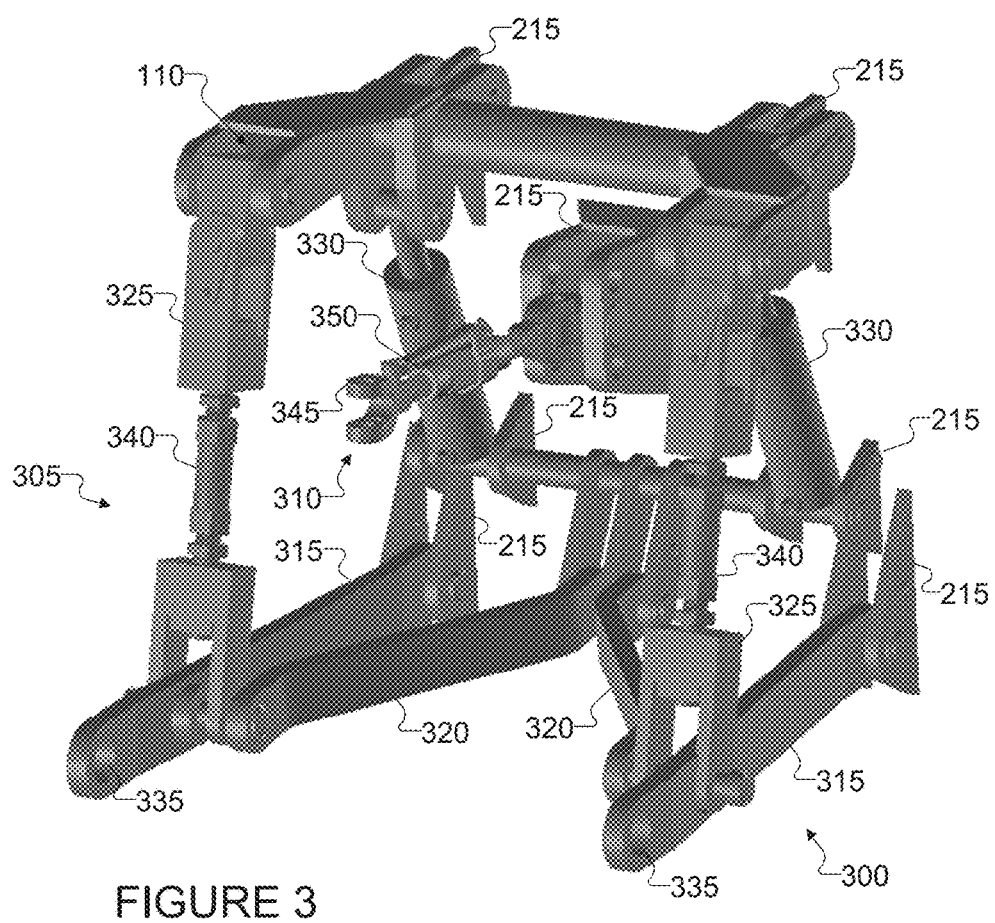

FIG. 3 illustrates an alignment assembly 110 of the dolly according to various embodiments of the present disclosure. The alignment assembly connections 215 from FIG. 2 are included for illustration on the connection of the alignment assembly 110. The alignment assembly 110 includes a first arm 300, a second arm 305, and a third arm 310. Each of the arms 300, 305, and 310 can be controlled in unison or individually.

The first arm 300 and second arm 305 each include a leveling beam 315, a stabilizing arm 320, an extension arm 325, and an actuator 330. The leveling beam 315 connects the chassis 105 to the plow hitch 115 using a hitch connection 335. The stabilizing arm 320 connects from the chassis 105 to the leveling beam 315. Placing the connection point, between the stabilizing arm 320 and the leveling beam 315, closer to the hitch connection 335 increases the stabilizing force. The extensions arm 325 is connected to the chassis 105 and the leveling beam 315. Placing the connection, between the extension arm 325 and the leveling beam 315, closer to the hitch decreases the amount of force required to raise and lower the plow hitch 115. The stabilizing arm 320 and the extension arm 325 are illustrated connecting to the leveling beam 315 at the same location, but could connect at different locations.

The extension arms 325 also each include an extension shaft 340. The extension shaft 340 is used to align the connection point 335 to the connection points on the plow hitch 115. The extension shaft 340 is illustrated as a screw type extension, but any type of extension device can be used. Increasing the length of the extensions shaft 340 will lower the connection points 335 and decreasing the length of the extension shaft will raise the connection points 335.

The third arm 310 connects from the chassis 105 to the plow hitch 115. The third arm 310 includes a plow hitch connection 345 an extension shaft 350. The plow hitch connection 345 connects the third arm 310 to the plow hitch 115. The extension shaft 350 can be the same or different to the extensions shafts 340. The plow connection 345 can be the same or different from the plow connections 335.

The first and second arms 300 and 305 are connected to actuators 330 used to raise and lower the plow hitch 115. When the plow hitch 115 is lowered, the dolly 100 can move under the plow or away from the plow. Raising the plow hitch 115 couples the dolly 100 with the plow.

Although FIG. 3 illustrates one example of an alignment assembly 110, various changes may be made to FIG. 3. The makeup and arrangement of the alignment assembly 110 in FIG. 3 is for illustration only. Components could be added, omitted, combined, or placed in any other suitable configuration according to particular needs. In general, the alignment assembly 110 can be configured in any suitable manner according to particular needs.

Figure 4:
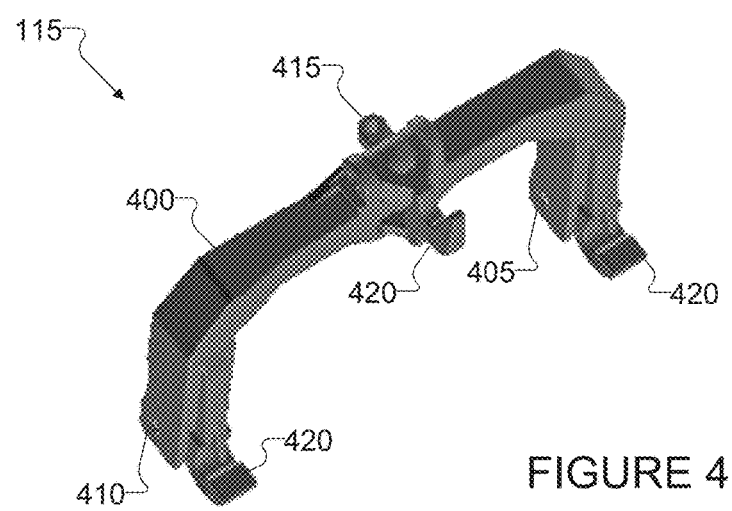

FIG. 4 illustrates a three connection point hitch 115 of the dolly according to various embodiments of the present disclosure. The plow hitch 115 includes a yoke 400, a first alignment connection 405, a second alignment connection 410, a third alignment connection 415 and a plurality of plow connections 420.

The yoke 400 provides the structural support for the plow hitch 115. The yoke 400 is illustrated in a horse shoe shape, but can be structured as any shape, for example, a square, triangle, etc. The plow hitch 115 includes a first connection alignment connection 405 for connection with the first arm 300, a second alignment connection 410 for connection with the second arm 305, and a third alignment connection 415 for connection with the third arm 310. The plow hitch includes plow connections 420 opposite of the alignment connections 405, 410 and 415. The connections 420 are illustrated as hooks, but could be any type of connection, for example, ball and joint, etc.

Although FIG. 4 illustrates one example of a plow hitch 115, various changes may be made to FIG. 4. The makeup and arrangement of the plow hitch 115 in FIG. 4 is for illustration only. Components could be added, omitted, combined, or placed in any other suitable configuration according to particular needs. In general, the plow hitch 115 can be configured in any suitable manner according to particular needs.

The description in this patent document should not be read as implying that any particular element, step, or function is an essential or critical element that must be included in the claim scope. Also, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim is understood and intended to refer to structures known to those skilled in the relevant art, as further modified or enhanced by the features of the claims themselves, and is not intended to invoke 35 U.S.C. § 112(f).

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A dolly, comprising:
   a chassis frame;
   a three point plow hitch mounted on the chassis frame and configured to connect to a plow; and
   a tractor hitch extension extending from the chassis frame by at least a predetermined distance and configured for connection with an articulating tractor,
   wherein the predetermined distance is sufficient to space the chassis frame from rear wheels of the articulating tractor when the dolly is connected to the articulating tractor, and
   where a width of tractor hitch extension is sufficiently narrow so as to not interfere with full turning of the rear wheels on the articulating tractor when the dolly is connected to the articulating tractor.

2. The dolly of claim 1, wherein the chassis frame further comprises a three connection point frame and a hitch extension.

3. The dolly of claim 2, wherein the three connection point frame is configured to connect and secure an alignment assembly.

4. The dolly of claim 2, wherein the hitch extension extends the three point plow hitch from a hitch connector a distance to provide clearance from the plow.

5. The dolly of claim 4, where the distance between the three point plow hitch from the hitch connector is 2-3 feet.

6. The dolly of claim 1, further comprising:
   an alignment assembly connecting the three point plow hitch to the chassis frame and configured to align connections of the three point plow hitch with the plow.

7. The dolly of claim 6, wherein the alignment assembly comprises a first arm, a second arm, and a third arm, each individually connecting from a three point plow frame to the three point plow hitch.

8. The dolly of claim 7, wherein the first arm and the second arm are configured to lift the three point plow hitch.

9. The dolly of claim 8, wherein the first arm and the second arm each includes an actuator configured to extend in a manner to lift the three point plow hitch.

10. The dolly of claim 7, wherein the third arm is configured to align the three point plow hitch.

11. A tractor assembly, comprising
    an articulating tractor configured to pull a plow; and
    a dolly connected to the articulating tractor, the dolly comprising:
    a chassis frame,
    a three point plow hitch mounted on the chassis frame and configured to connect to a plow, and
    a tractor hitch extension extending from the chassis frame by at least a predetermined distance and configured for connection with an articulating tractor,
    wherein the predetermined distance is sufficient to space the chassis frame from rear wheels of the articulating tractor, and wherein a width of tractor hitch extension is sufficiently narrow so as to not interfere with full turning of the rear wheels on the articulating tractor.

12. The dolly of claim 11, wherein the chassis further comprises a three connection point frame and a hitch extension.

13. The dolly of claim 12, wherein the three connection point frame is configured to connect and secure an alignment assembly.

14. The dolly of claim 12, wherein the hitch extension extends the three point plow hitch from a hitch connector a distance to provide clearance from the plow.

15. The dolly of claim 14, where the distance between the three point plow hitch from the hitch connector is 2-3 feet.

16. The dolly of claim 11, further comprising:
an alignment assembly connecting the three point plow hitch to the chassis and configured to align connections of the three point plow hitch with the plow.

17. The dolly of claim 16, wherein the alignment assembly comprises a first arm, a second arm, and a third arm, each individually connecting from a three point plow frame to the three point plow hitch.

18. The dolly of claim 17, wherein the first arm and the second arm are configured to lift the three point plow hitch.

19. The dolly of claim 18, wherein the first arm and the second arm each includes an actuator configured to extend in a manner to lift the three point plow hitch.

20. The dolly of claim 17, wherein the third arm is configured to align the three point plow hitch.

\* \* \* \* \*